United States Patent Office

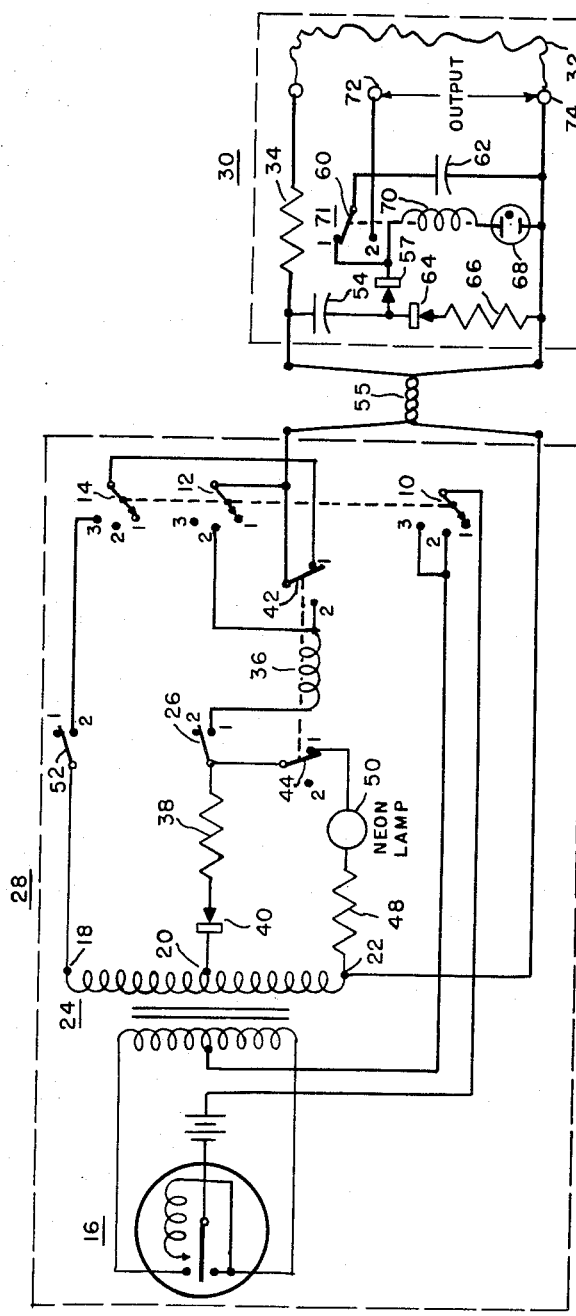

2,939,054
Patented May 31, 1960

2,939,054

REMOTE CONTROL DEVICE

Frank E. Caruso, Oceanport, and Rudolf A. Stampfl, Asbury Park, N.J., assignors to the United States of America as represented by the Secretary of the Army Filed June 25, 1958, Ser. No. 744,625

5 Claims. (Cl. 317—157)

(Granted under Title 35, U.S. Code (1952), sec. 266)

The invention described herein may be manufactured and used by or for the Government for governmental purposes, without the payment of any royalty thereon.

The invention relates to remote indicating and control devices and particularly to a system for providing both remote monitoring and remote control.

There are many applications for a simple system which will allow remote monitoring or sensing for the occurrence of some event and, upon the occurrence of that event, to provide means for controlling some device at the scene of the occurrence. An example would be the detection of enemy troops entering an area and the discharge of an explosive previously planted in the area.

It is an object of the present invention to provide an improved and simple means of remote indicating and control which requires only a single pair of wires connecting the observer with the observed area.

It is a further object of the invention to provide either manual or automatic control upon the occurrence of the critical event.

In accordance with the invention a remote sensing and control system is provided in which a control station monitors, via a direct-current energized, two-conductor line, the continuity of a conductor strategically placed at the remote area or station and connected across the two-conductor line. A relay coil is connected in circuit with the line at the control station so that if the line circuit changes, the relay is deenergized and relay contacts cause a signal light to turn on and an alternating current to be automatically applied to the line. If desired, the alternating current may be withheld until manually switched on the line by an operator. At the remote station the alternating current passes through a direct current blocking capacitor to a rectifier. The output of the rectifier is applied to charge a capacitor and across this capacitor is connected a voltage regulator device, such as a gas tube, and a relay control coil in series therewith. When the voltage across the capacitor rises sufficiently, the voltage regulator conducts and the relay coil is energized. This causes associated relay contacts to disconnect the now charged capacitor from the rectifier and connect it to any circuit to be triggered thereby.

For a better understanding of the invention, together with other objects thereof, reference is made to the following description and accompanying drawing which shows a schematic circuit diagram of an embodiment of the invention.

Referring now to the drawing, initially the equipment is as shown in an off condition with triple-throw ganged switches 10, 12, 14 in their No. 1 position. To commence operation these switches are advanced through the No. 2 position to their No. 3 position. Switch No. 12 must be a make before break type. When the movable contact of switch 10 reaches its No. 2 position, vibrator type power supply 16 is energized and an alternating current (A.C.) voltage appears at terminals 18, 20 and 22 of transformer 24. With switch 26 in its closed position a direct current will flow through the circuit from terminal 22 through one side of the field wire connecting control station 28 and remote station 30, through break-wire 32 and resistor 34, back through the other side of the field wire to station 28, through contact 2 of switch 12, relay coil 36, resistor 38, rectifier 40 to terminal 20. Relay coil 36 which is now energized causes switch 42 to assume its No. 2 position and switch 44 to assume its No. 2 position. Switch 12 is now bypassed and ganged switches 10, 12, and 14 are turned to their No. 3 positions. With a direct current flowing as indicated above, the circuit is set for sensing and may thereafter be operated in three ways. The first of these would be employed where it is desired to give an operator at the control station a warning upon the breaking of the break-wire and allow him to choose a time thereafter to apply a trigger signal to the line. To accomplish this switch 52 is set in its No. 1 position. Now if the break-wire is opened and the direct current circuit interrupted, relay coil 36 is deenergized and associated relay switches 42 and 44 assume their No. 1 position. This causes switch 44 to close the circuit through resistor 48 and neon warning lamp, which lights up. Switch 42 now disconnects the direct current from the line and connects one side of the line through switch 14 to switch 52, which is initially in its open or No. 1 position. At the instance of the operator, switch 52 may be advanced to its No. 2 position causing an alternating current to be applied by transformer output terminals 18 and 22 across the line 55 and thus to the remote station. At the remote station, this alternating current energizes a voltage doubler rectifier consisting of capacitor 54, 62, diodes 57 and 64, and resistor 66. The output of the rectifier flows through contacts 60 (in their No. 1 position) to charge capacitor 62. When capacitor 62 is charged sufficiently to provide a breakdown voltage for gas regulator 68, the latter breaks down, allowing a current to flow through relay coil 70. This in turn causes associated relay contacts 60 to assume their No. 2 position and connects the now charged capacitor 62 across output terminals 72 and 74 and to any external circuit connected thereto, such as a detonating device.

A second mode in which the circuit may be operated is to have switch 52 initially set in its No. 2 position, in which case the alternating current is applied to the remote circuit automatically upon the breaking of the wire and accordingly the output terminals will be automatically energized.

A third mode of operation may be employed when it is desirable to energize the output circuit 71 before the break-wire is broken. In this case switch 52 would be placed in its No. 2 position and switch 26 would be moved from its closed No. 1 position to its open No. 2 position. By opening switch 26, relay coil 36 is denergized and relay switch 42 is caused to assume its No. 1 position closing the alternating current circuit across the line. This energizes output circuit 71, and after capacitor 62 charges, an output voltage is applied across output terminals 72 and 74.

While there has been described what is at present considered to be a preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A remote sensing and control system comprising a control station and a remote station connected by means of two conductors, said remote station comprising detection means connected across said two conductors changing impedance upon the occurrence of a given event, said control station comprising means connected to said conductors for applying a first direct current potential to said conductors and for sensing the impedance offered by said conductors and said detection means; energizing means comprising a relay responsive to a given change in said impedance for applying a second alternating current potential across said conductors; and remote station output means connected to said conductors, unresponsive to said first potential, and responsive to said second potential, for energizing a load circuit, comprising a single pole-double throw output relay, a voltage regulator, a capacitor, a pair of output terminals, a rectifier, a relay energizing coil associated with said output relay and connected in series with said voltage regulator and said rectifier across said conductor, said capacitor being connected by said output relay across said relay energizing coil and voltage regulator when said relay energizing coil is unenergized and being connected across said output terminals when said relay coil is energized.

2. A remote sensing and control system as set forth in claim 1, wherein said means for applying a second potential includes a switch for switching on and off said second potential.

3. A remote sensing and control system as set forth in claim 2, wherein said first named relay is energized in series with contacts associated with said relay which are closed when said relay is energized, and wherein said energizing means includes auxiliary means for temporarily shorting said last named contacts.

4. A remote sensing and control system as set forth in claim 3, wherein said energizing means further comprises a switch for energizing and denergizing said first named relay.

5. A remote sensing and control system as set forth in claim 4, wherein said first named relay is energized in series with one of said conductors.

References Cited in the file of this patent

UNITED STATES PATENTS

| | | |
|---|---|---|
| 1,732,276 | Morrison | Oct. 22, 1929 |
| 1,909,212 | Muehter | May 16, 1933 |
| 2,177,843 | Seely | Oct. 31, 1939 |
| 2,287,164 | Bowsher | June 23, 1942 |
| 2,814,795 | Spooner | Nov. 26, 1957 |